F. MESINGER.
SADDLE FOR MOTOR CYCLES.
APPLICATION FILED JUNE 16, 1910.
969,791. Patented Sept. 13, 1910.
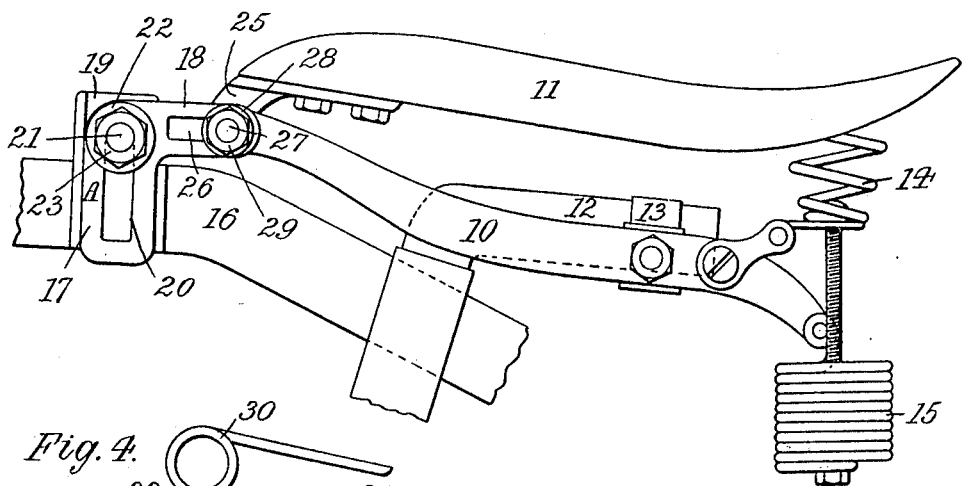
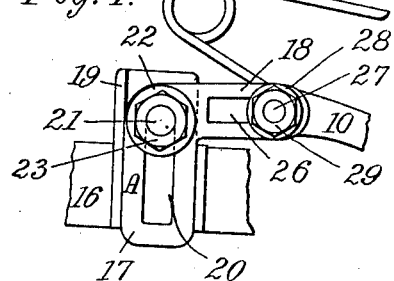
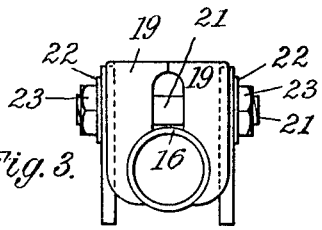
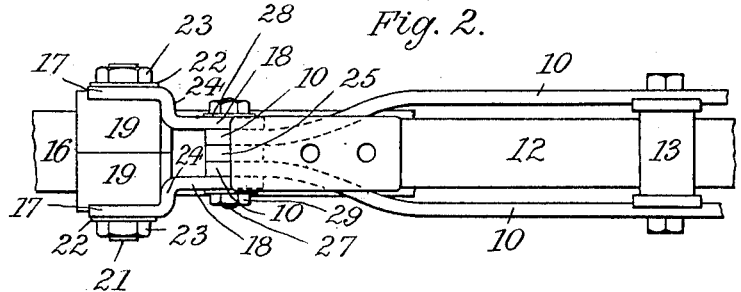
Witnesses:
Katherine Koch.
Daniel Holmgren.
Inventor
Frederick Mesinger,
By his Attorneys

UNITED STATES PATENT OFFICE.

FREDERICK MESINGER, OF NEW YORK, N. Y.

SADDLE FOR MOTOR-CYCLES.

969,791.  Specification of Letters Patent.  Patented Sept. 13, 1910.

Application filed June 16, 1910. Serial No. 567,176.

*To all whom it may concern:*

Be it known that I, FREDERICK MESINGER, a citizen of the United States, residing at New York city, Bronx, county and State of New York, have invented a new and Improved Saddle for Motor-Cycles, of which the following is a specification.

This invention relates to a saddle more particularly adapted for motor cycles, and so constructed that it may be readily adjusted to the reach and height of the rider.

In the accompanying drawing: Figure 1 is a side elevation of a saddle embodying my invention, Fig. 2 a plan of the forward portion thereof with the seat removed, Fig. 3 a front view of the saddle adjusting device, and, Fig. 4 a side view of a modification of the forward seat support.

The frame 10 of the saddle carrying the seat 11, is connected to the seat post 12 of the cycle by a suitable clamping device 13. The back of the seat is preferably supported by a back spring 14 and a supplemental spring 15 which do not constitute part of the present invention.

In front of seat 11, the cycle frame 16 is straddled by a pair of L shaped plates A each composed of a vertical arm 17 and an upper horizontal rearwardly extending arm 18. Arms 17 encompass a pair of recessed jaws 19 that are shaped to snugly embrace frame 16. Through longitudinal slots 20 of arms 17, extends across the top of frame 16, a bolt 21, that also passes through a transverse upper bore of jaws 19. The threaded ends of bolt 21 carry washers 22 and nuts 23. It will be seen that by slacking said nuts frame A may be vertically adjusted upon frame 16. The two horizontal arms 18 of frame A, are bent inward at 24, so that they are arranged in greater proximity to each other, than the upright arm 17. Arms 18 encompass the front perforated ends of frame 10, and also a perforated lug or projection 25 secured to the front of seat 11, and interposed between said ends. Within arms 18 are formed longitudinal slots 26, adapted for the admission of a bolt 27, said bolt likewise passing through the perforations of frame 10, and lug 25. The threaded ends of bolt 27 carry washers 28 and nuts 29, so that by slacking the nuts, frame 10, together with seat 11, may be either adjusted backward or forward along frame A. This adjustment together with the vertical adjustment of frame A upon frame 16 hereinabove referred to, permits the seat to be set backward or forward, as well as higher or lower to conform to the reach or height of the cyclist.

In Fig. 4, the front projection of seat 11, is shown to be formed by a front suspension spring 30, having an eye adapted for the reception of bolt 27.

I claim:

1. A saddle provided with a pair of L shaped frames, having vertical arms and rearwardly extending upper horizontal arms, means for vertically adjusting the vertical arms upon the cycle, a seat, and means for horizontally adjusting the seat upon the horizontal arms.

2. A saddle provided with a pair of L shaped frames having vertical slotted arms and rearwardly extending horizontal slotted arms, a first bolt engaging the slots of the vertical arms, a seat, an apertured projection on the seat, and a second bolt engaging said projection and the slots of the horizontal arms.

3. A saddle provided with a pair of L shaped frames having vertical slotted arms and rearwardly extending horizontal slotted arms, apertured jaws encompassed by the vertical arms, a first bolt engaging said jaws and the slots of the vertical arms, a seat having an apertured projection, an apertured seat-support, and a second bolt engaging said projection and support and passing through the slots of the horizontal arms.

FREDERICK MESINGER.

Witnesses:
H. MESINGER,
HERMAN ELSTO.